United States Patent
Verma et al.

(10) Patent No.: US 12,417,091 B2
(45) Date of Patent: Sep. 16, 2025

(54) AUTO HEALING OF RUNTIME EXCEPTIONS USING INTELLIGENT BUILD SYSTEM AND GENERATIVE AI

(71) Applicant: Bank of America Corporation, Charlotte, NC (US)

(72) Inventors: Sandeep Verma, Haryana (IN); Divya Sharma, Delhi (IN); Sameer Grover, Punjab (IN); Jaya Sindhu Parakala, Haryana (IN); Divya Gaur, Ghaziabad (IN); Narender Mudgal, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 185 days.

(21) Appl. No.: 18/369,179

(22) Filed: Sep. 17, 2023

(65) Prior Publication Data

US 2025/0094167 A1    Mar. 20, 2025

(51) Int. Cl.
| | |
|---|---|
| *G06F 8/71* | (2018.01) |
| *G06F 8/30* | (2018.01) |
| *G06F 8/41* | (2018.01) |
| *G06F 8/65* | (2018.01) |
| *G06F 11/3604* | (2025.01) |
| *G06F 11/3668* | (2025.01) |

(52) U.S. Cl.
CPC ............ *G06F 8/71* (2013.01); *G06F 8/30* (2013.01); *G06F 8/41* (2013.01); *G06F 8/65* (2013.01); *G06F 11/3604* (2013.01); *G06F 11/3668* (2013.01)

(58) Field of Classification Search
None
See application file for complete search history.

(56) References Cited

U.S. PATENT DOCUMENTS

| 4,665,523 A | 5/1987 | Citron et al. |
| 5,539,877 A | 7/1996 | Winokur et al. |
| (Continued) | | |

FOREIGN PATENT DOCUMENTS

| WO | 2020097221 A1 | 5/2020 |

OTHER PUBLICATIONS

Emory Craig, "Visualize Code in Virtual Reality", Digital Bodies ,Jun. 10, 2019 https://www.digitialbodies.net/vr-experience/visualize-code-in-virtual-reality/ visited on May 12, 2021.

(Continued)

*Primary Examiner* — Toan H Vu
(74) *Attorney, Agent, or Firm* — Banner & Witcoff, Ltd.

(57) ABSTRACT

During a software development lifecycle of a software application, application library versions are modified and multiple versions are built and packaged to be installed on different computing systems. An intelligent prediction and capture of runtime errors that may be encountered during a runtime of a software application provides a system-agnostic intelligent software code compiler/build system that intelligently identifies runtime errors at a build stage using artificial intelligence (AI) and automatically encapsulates specific software code to auto-heal runtime exceptions caused by updates to library files. The system may optionally also output a solution to the runtime error to the graphical user interface (GUI) of a software developer capable of performing another software application build.

20 Claims, 7 Drawing Sheets

(56) References Cited

U.S. PATENT DOCUMENTS

| | | |
|---|---|---|
| 6,343,236 B1 | 1/2002 | Gibson et al. |
| 6,742,141 B1 | 5/2004 | Miller |
| 6,760,903 B1 | 7/2004 | Morshed et al. |
| 7,003,560 B1 | 2/2006 | Mullen et al. |
| 7,058,860 B2 | 6/2006 | Miller et al. |
| 7,062,755 B2 | 6/2006 | Partamian et al. |
| 7,080,287 B2 | 7/2006 | Salem |
| 7,146,542 B2 | 12/2006 | Srinivasan et al. |
| 7,216,308 B2 | 5/2007 | Teig et al. |
| 7,257,735 B2 | 8/2007 | Arend |
| 7,343,529 B1 | 3/2008 | Klinkner et al. |
| 7,412,626 B2 | 8/2008 | Wood et al. |
| 7,509,538 B2 | 3/2009 | Triou, Jr. et al. |
| 7,565,577 B2 | 7/2009 | Adams et al. |
| 7,640,458 B2 | 12/2009 | Rao et al. |
| 7,702,959 B2 | 4/2010 | Hwang et al. |
| 7,861,120 B2 | 12/2010 | Cui |
| 7,861,125 B2 | 12/2010 | Yamazaki et al. |
| 7,904,403 B2 | 3/2011 | Birsan et al. |
| 7,984,334 B2 | 7/2011 | Champlin et al. |
| 8,312,324 B2 | 11/2012 | Foley et al. |
| 8,473,894 B2 | 6/2013 | Fox et al. |
| 8,526,940 B1 | 9/2013 | Chowdhary et al. |
| 8,566,267 B1 | 10/2013 | Ledbetter, Jr. et al. |
| 8,578,335 B2 | 11/2013 | Bates et al. |
| 8,595,553 B2 | 11/2013 | Goertler et al. |
| 8,621,279 B1 | 12/2013 | Antukh et al. |
| 8,645,760 B2 | 2/2014 | van Gilluwe |
| 9,329,982 B2 | 5/2016 | Arif et al. |
| 9,367,427 B2 | 6/2016 | Andre et al. |
| 9,436,589 B2 | 9/2016 | Li et al. |
| 9,529,662 B1 | 12/2016 | Wangkhem et al. |
| 9,542,176 B2 | 1/2017 | Bird et al. |
| 9,575,874 B2 | 2/2017 | Gautallin et al. |
| 9,658,936 B2 | 5/2017 | Krajec et al. |
| 9,665,474 B2 | 5/2017 | Li et al. |
| 9,672,252 B2 | 6/2017 | Andry et al. |
| 9,959,306 B2 | 5/2018 | Chang et al. |
| 10,127,022 B2 | 11/2018 | Sharma et al. |
| 10,229,028 B2 | 3/2019 | Addleman et al. |
| 10,296,717 B2 | 5/2019 | Isaacs |
| 10,346,358 B2 | 7/2019 | Gorelik |
| 10,552,242 B2 | 2/2020 | Purushothaman |
| 10,642,721 B2 | 5/2020 | Kulkarni et al. |
| 10,657,146 B2 | 5/2020 | Bath et al. |
| 10,747,571 B2 | 8/2020 | Fuchs |
| 10,805,316 B2 | 10/2020 | Aditham et al. |
| 10,922,489 B2 | 2/2021 | Ray et al. |
| 10,976,907 B2 | 4/2021 | Stojanovic et al. |
| 11,178,182 B2 | 11/2021 | Saxena et al. |
| 11,281,673 B2 | 3/2022 | Nanda et al. |
| 11,360,950 B2 | 6/2022 | Harrison et al. |
| 11,397,744 B2 | 7/2022 | Wan et al. |
| 11,409,764 B2 | 8/2022 | Rehal |
| 11,604,804 B2 | 3/2023 | Bapat et al. |
| 12,253,932 B1 * | 3/2025 | Schumacher ............. G09B 7/02 |
| 2003/0005362 A1 | 1/2003 | Miller et al. |
| 2005/0166094 A1 * | 7/2005 | Blackwell ............. G06F 11/368 |
| | | 714/38.14 |
| 2006/0036562 A1 | 2/2006 | Wu |
| 2008/0155360 A1 | 6/2008 | Bates et al. |
| 2009/0158099 A1 | 6/2009 | Cui |
| 2009/0193298 A1 | 7/2009 | Mukherjee |
| 2017/0031660 A1 * | 2/2017 | Beam ........................ G06F 8/41 |
| 2019/0155673 A1 | 5/2019 | Brooks et al. |
| 2019/0171650 A1 | 6/2019 | Botev et al. |
| 2019/0324781 A1 | 10/2019 | Ramamurthy et al. |
| 2020/0019882 A1 | 1/2020 | Garg et al. |
| 2020/0117434 A1 | 4/2020 | Biskup et al. |
| 2020/0401397 A1 | 12/2020 | Thomas et al. |
| 2022/0051112 A1 | 2/2022 | Wang et al. |
| 2022/0179778 A1 * | 6/2022 | Ramanjani ............. G06N 20/10 |
| 2022/0317979 A1 * | 10/2022 | Araujo Soares .... G06F 16/9024 |
| 2022/0405193 A1 * | 12/2022 | Ashok ................... G06F 11/004 |
| 2023/0087837 A1 * | 3/2023 | Hwang ................. G06N 3/048 |
| | | 706/12 |
| 2023/0131355 A1 * | 4/2023 | Sweary ................. G06F 16/213 |
| | | 709/217 |
| 2023/0153089 A1 | 5/2023 | Bawcom et al. |
| 2023/0161785 A1 | 5/2023 | Bakshan et al. |
| 2024/0329983 A1 * | 10/2024 | Bregman .................. G06F 8/77 |
| 2025/0094167 A1 * | 3/2025 | Verma ....................... G06F 8/41 |
| 2025/0139140 A1 * | 5/2025 | Gopalan ............. G06F 16/3329 |

OTHER PUBLICATIONS

Bonthu Kotaiah et al., "Model for Software Errors Prediction Using Machine Learning to Improve the Software Reliability", The International Journal of Soft Computing and Software Engineering [JSCSE], vol. 3, No. 3, Special Issue: The Proceeding of International Conference on Soft Computing and Software Engineering 2-13 [SCSE'13] San Francisco State University, CA Mar. 2013, e-ISSN: 2251-7545, visited on May 12, 2021.

Stef Shalan et al., "Runtime Prediction of Failure Modes from System Error Logs", 2013 International Conference on Engineering of Complex Computer Systems, 2013 IEEE, School of Computing Queen's University, Kingston Ontario, Canada, visited on May 13, 2021.

* cited by examiner

AUTO HEALING OF RUNTIME EXCEPTIONS USING INTELLIGENT BUILD SYSTEM AND GENERATIVE AI

BACKGROUND

During a software development lifecycle, software applications are built and packaged for delivery. In some cases, build packages may encounter runtime errors causing an installation to fail. Often, these runtime errors are never identified, saved or scanned at any stage in development so, even in a perfect system, runtime errors may be encountered many years after product launch.

During a software development lifecycle of a software application, the application code is modified and multiple versions are built and packaged to be installed on different computing systems, such as on a software development computing system, software testing computing systems, and/or production or end-user computing systems. Build packages may encounter runtime errors causing an installation to fail, where the causes of the failures may not be identified or resolved at build/compile-time. As such, a need has been recognized for an artificial intelligent (AI) computing system capable of predicting/identifying runtime errors of software application build packages, resolving the predicted runtime errors, and automatically repackaging, when appropriate, the build to significantly reduce a probability that a runtime error will occur during installation or execution of a compiled binary library.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating computer-readable software code for runtime exceptions due to, inter alia, version changes of runtime libraries (e.g., third-party libraries).

Aspects of the disclosure relate to intelligent prediction of runtime errors that may be encountered during a runtime of a software application. One or more aspects of the disclosure relate to a system agnostic intelligent software code compiler/build system that intelligently identifies runtime errors at a build stage using artificial intelligence (AI) and automatically encapsulates specific software code to auto-heal runtime exceptions caused by updates to library files, and then output a solution to the runtime error to the graphical user interface (GUI) of a software developer capable of performing another software application build.

In our modern-day software application world, many applications are dependent on multiple JARs/frameworks and external libraries and most of them provide black box access (without code access) to a main container. When there is an update in any of the framework, such as when a newer version is integrated within the app, often time this results in multiple exceptions (both compile-time and runtime) while integration. A summary (see Table 1) of differences between compile-time and runtime errors/exceptions include but are not limited to:

TABLE 1

| Compile-time Errors | Runtime Errors |
| --- | --- |
| Compilers can easily detect compile-time errors during the development of code. | A compiler cannot easily detect a runtime error. Thus, we need to identify it during the execution of code. |
| A compile-time error generally refers to the errors that correspond to the semantics or syntax. | A runtime error refers to the error that we encounter during the code execution during runtime. |
| We can easily fix a compile-time error during the development of code. | A compiler cannot identify a runtime error. But we can fix it after the execution of code and identification of the code in prior |

Compile-time exceptions are easier to resolve since many modern build systems highlight the compile-time bugs and guide the developers to possible fixes at the time of code commit/build. Build systems ensure that all the compile-time issues are fixed before a successful build. But on the other hand, runtime exceptions are difficult to catch as they appear when the code is running. In a complex and big application, it is almost impossible to achieve 100% code coverage through testing. Typically, achieving 70-80% code coverage is considered to be a good metrics, so there is always some percentage of code remaining in the source code of an application which directly goes into the production. When the remaining 20-30% of code, which missed the code coverage in testing, is executed in production, such as when a unique scenario is built from customer's activities, the system is vulnerable to trigger/land into one or more runtime exceptions. One common runtime exception is "Class Not Found"—this generally comes when code is not able to find a class which is being referenced in the code. This may occur when an application is upgraded to a newer version and the function/interface of its old version is deprecated/removed in the newer version. Some piece of code that was not covered in testing (e.g., code coverage) may still be accessing it as in the old way, thus resulting in runtime exceptions/errors.

In some embodiment, a method is disclosed herein for reducing runtime errors that halt execution of compiled programming source code due to a new version of a library that is incompatible with a previous version of the library having an application program interface (API) call in the compiled programming source code. The method may comprise at least some of the following steps. For example, scanning, by a generative artificial intelligence (AI) engine in an intelligent build system, at least the programming source code identified in a build script. And identifying, by the generative AI engine, a chance that a runtime error occurs when at least one line in the programming source code executes the API call. The new version of the library may be incompatible with the API call in the previous version of the library. In such instances, the generative AI engine may generate a wrapper code and encapsulate, by the intelligent build system, the at least one line in the programming source code with the wrapper code by replacing the at least one line in the programming source code with the wrapper code. The intelligent build system may preserve the previous version of the library in one or more repositories. In some examples, the preserving makes the previous version of the library available for execution of the API call by the wrapper code. The intelligent build system may update the mapping table to redirect the API call in the programming source code to the previous version of the library or the new version of the library depending on the wrapper code.

Furthermore, the method described herein may, in some example, include a generative AI engine comprising a pre-trained artificial neural network model. In some examples, the generative AI engine may comprises a pre-trained model that is trained on at least a log from one or more deployed computing environments, build packages, and library API reference documentation. In some examples, the preserving step for the previous version of the library may comprises: storing the previous version of the library in the one or more repositories; storing the new version of the library in the one or more repositories, wherein the new version of the library and the previous version of the library are both available for execution of the API call by the wrapper code; and causing the intelligent build system to update the mapping table. In some examples, each row in the mapping table comprises a source code block identifier and a compatible library version identifier, and execution of the compiled code is directed to a first compatible library version identifier corresponding to the new version of the library stored in the one or more repositories if no error is caught by the try-catch syntax structure, else the execution of the compiled code is directed to a second compatible library version identifier corresponding to the previous version of the library stored in the one or more repositories without halting execution of the compiled code.

In some embodiments, the intelligent build system performing the steps disclosed herein may further update, by the generative AI engine, the build script to package the new version of the library and the previous version of the library into a build of the compiled programming source code; and then deploy the compiled programming source code with both the new version of the library and the previous version of the library to one or more deployed computing environments. In some examples, the intelligent build system may further deploy the compiled programming source code with both the new version of the library and the previous version of the library to a virtual computing environment for testing and AI model training purposes. And the multiple versions of the library may comprise appropriate library dependencies, and in some instances, the library may include a project jar file. In some examples, the runtime error is Class Not Found, and the runtime error occurs when the at least one line in the programming source code fails to find an object class that has been deprecated during a transition from the previous version of the library to the new version of the library.

Furthermore, in some examples, the chance that a runtime error occurs is calculated by: (i) testing execution of the programming source code to catch if any runtime errors occur using API calls to the new version of the library, and (ii) when any runtime errors are caught, retrying execution of the programming source code using API calls to the previous version of the library. In other examples, the chance that a runtime error occurs is determined by: (i) testing execution of the programming source code to catch if any runtime errors occur using API calls to the new version of the library, and (ii) when any runtime errors are caught, retrying execution of the programming source code using API calls to the previous version of the library. In yet other examples, the chance that a runtime error occurs is determined by the generative AI engine using at least a log from one or more deployed computing environments and library API reference documentation. Moreover, in some examples, the generative AI engine comprises a pre-trained model that is trained on at least information of historical successful builds and historical runtime errors.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 1A and FIG. 1B (collectively referred to as "FIG. 1") show illustrative block diagrams in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. Aspects of the disclosure provide effective, efficient, scalable, and convenient technical solutions that address and overcome the technical problems associated with accurately evaluating computer-readable software code for runtime exceptions due to, inter alia, version changes of runtime libraries (e.g., third-party libraries).

Aspects of the disclosure relate to intelligent prediction of runtime errors that may be encountered during a runtime of a software application. One or more aspects of the disclosure relate to a system agnostic intelligent software code compiler system that intelligently identifies runtime errors at a build stage using artificial intelligence (AI) and automatically encapsulates specific software code to auto-heal runtime exceptions caused by updates to library files, and then output a solution to the runtime error to the graphical user interface (GUI) of a software developer capable of performing another software application build.

Build systems ensure that all the compile-time issues are fixed before a successful build, but the system may still be vulnerable to trigger/land into one or more runtime exceptions. One common runtime exception is "Class Not Found"—this generally comes when code is not able to find a class which is being referenced in the code. This may occur when an application is upgraded to a newer version and the function/interface of its old version is deprecated/removed in the newer version. Some piece of code that was not covered in testing (e.g., code coverage) may still be accessing it as in the old way, thus resulting in runtime exceptions/errors.

Figure 1A:
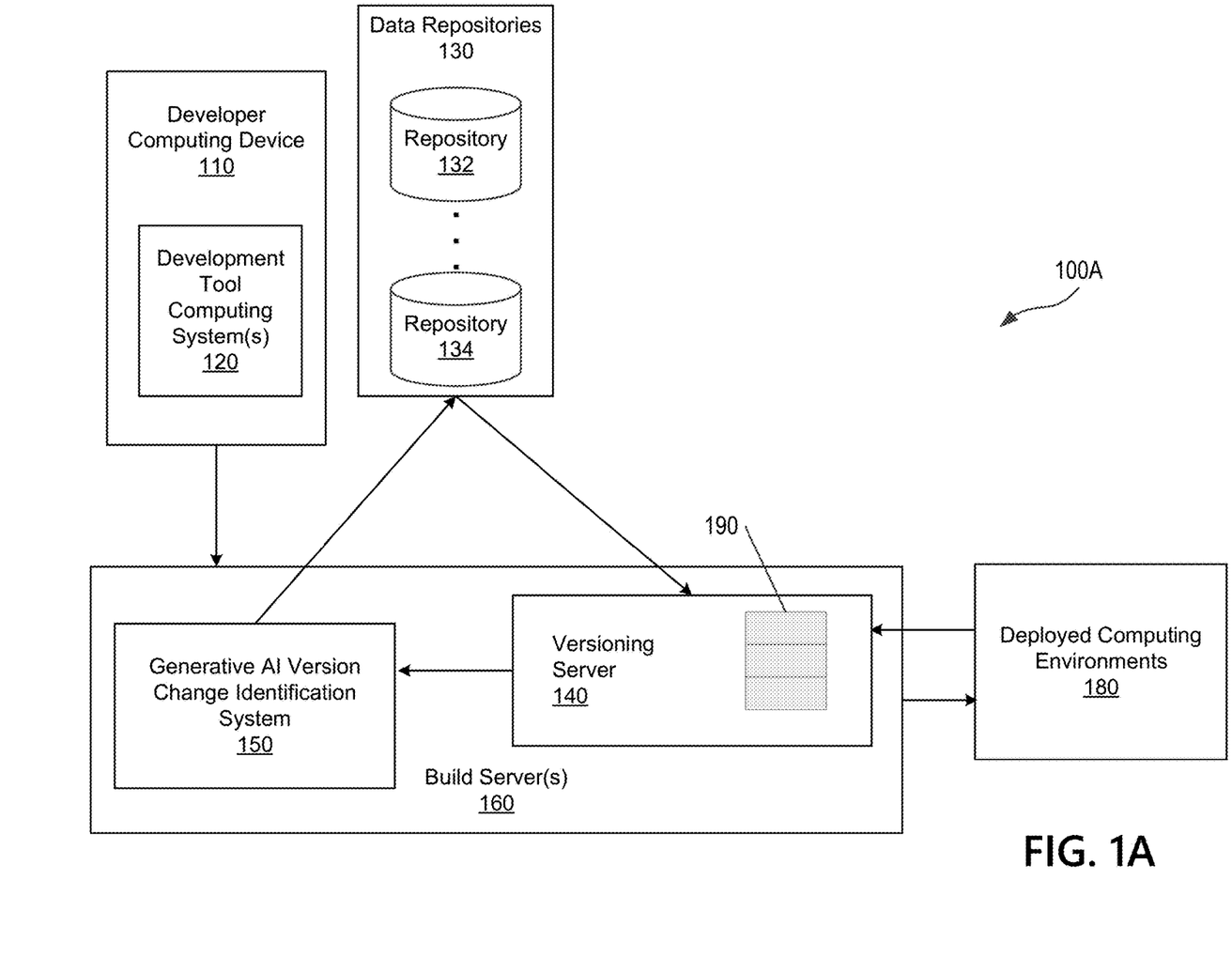
FIG. 1A shows an illustrative block diagram of an intelligent build system and generative artificial intelligence (AI) to automatically predict and resolve runtime errors in accordance with one or more aspects described herein.

FIG. 1A shows an illustrative block diagram of an intelligent build system and generative artificial intelligence (AI) to automatically predict and resolve runtime errors in accordance with one or more aspects described herein. Some examples of runtime errors include but are not limited to API calls to a runtime library (e.g., a third-party library, an external runtime library, or the like) that has a changed behavior, parameter, or other characteristic from a prior version to a newer version such that a compiler (or other interpreter and/or validator of the source code) at the time of the code build (e.g., compilation, packaging, or the like) will approve the source code but for which an error will be triggered at the time of execution (i.e., at runtime).

Aspects of the disclosed embodiments may be integrated into existing project management and comprehension tools, such as Maven and other open source build automation tools to provide developers a complete build lifecycle framework. One or more tools may be installed on build server(s) 160. Using such tools, development teams can efficiently automate a software project's build infrastructure using, inter alia, standard directory layouts and default build lifecycles. This can be especially advantageous when creating an application with lots of third-party dependencies where it can be onerous to track from where the dependency can be downloaded and other details about each dependency. Some such tools may also be designed to integrate with or interact with plug-ins that allow the adding of other actions to the standard compile, test, package, install, and/or deploy actions, including but not limited to implementing continuous integration (CI) and retrieving the appropriate library dependencies (such as project jar files, including their own dependencies) for a project as a whole.

In FIG. 1A, the generative AI engine (e.g., the generative AI version change identification (ID) system 150) may use the AI learning model (e.g., a supervised model, an unsupervised model, and/or the like), such as a classic neural network model, a convolutional neural network model, a recurrent neural network model, a self-organizing map model, a Boltzmann machine model, an autoencoder model, and the like. In some cases, the system 150 may monitor for new inputs, such as a new production version release indication, a new test version release indication, a revised version release indication that may be received from the versioning server 140 during a code push. The system 150, upon receiving an indication of a new version push, may automatically analyze, using the trained model, to identify and/or predict possible runtime errors. In some cases, the system 150 may associate prediction information, such as an indication of successful runtime operation, a prediction of runtime errors, and indication of an indeterminate runtime result (e.g., when a prediction that the build will encounter runtime errors or will install correctly is not deterministic), with a version, such as in a data entry in one or more of the code repositories 130 or other data storage associated with the versioning server 140 or the system 150. Version information may include software component information, build configuration information, prediction information and the like. In some days, prediction information may be stored in metadata that may be associated with versioning information and stored in a data repository associated with the system 150.

The system 150 may collect historical production version information and/or test framework code from one or more different software development tool computing systems and/or software test computing systems, such as from the versioning server 140. Additionally, the system 150 may collect historical production version runtime error information and/or fixed solution information, such as from the deployed computing environments (e.g., installation log information, system log information, and the like). The system 150 may train the model based on the gathered historical source code information and/or the runtime error information and fixed solution information, such as by utilizing an unconventional usage deep learning recurrent neural network algorithm.

In some cases, the system 150 may analyze new inputs such as new production version information, test framework code components that may be received from the versioning server 140. The system 150 may process the trained model to detect and/or predict production-based runtime errors and may set a flag identifying description of a predicted runtime error. For example, the system 150 process new production version information using the trained model to identify or predict a likelihood that if the version was built and deployed, a high likelihood exists that this deployed version will crash when installed on production servers with runtime errors. In such cases (e.g., when a probability that a version will crash meets or exceeds a threshold condition), the system 150 analyze and process the version information to automatically resolve the identified errors and route the version for repackaging.

In some cases, the system 150 may predict a runtime error during a pre-build stage. For example, the system 150 may receive an input identifying a new production build, a new development build, or a new production build from the versioning server. The system 150 may identify a runtime error or may predict a runtime error based on processing of the input using the trained AI deep learning model trained using information of historical successful builds and historical runtime errors encountered in one or more production environments. In some embodiments, if the system 150 predicts no errors—no predicted runtime errors to be encountered on the production servers with the build, the system 150 may clear a flag (e.g., a runtime error flag=0). Based on this flag, the system 150 indicates to the build server 160 that a particular build is good to deploy to production, and the build server 160 may be triggered by the flag to build the version release package via a release pipeline to be deployed to one or more applicable deployed computing environments, such as a production computing environment, a testing computing environment and/or a development computing environment. Status information from the deployment/build that may indicate a successful deployment/build and/or whether one or more errors were encountered during deployment/build may be saved and/or communicated (e.g., pushed, pulled) to the system 150.

The system 150 may include one or more artificial intelligence models (e.g., an autoregressive language model) such as a generative pre-trained transformer (GPT-3) model. Such models may allow the system 150 to analyze queries and/or source code and produce human-like text or database queries to automatically reconfigure the build code for the versioning server. For example, the system 150 may generate SQL code to configure a build process for a version of the software application. The system 150 may process the artificial intelligence model to the code by resolving identified runtime errors based on its historical learning of the trained model that is based on historical production runtime errors and/or solutions to the historical runtime errors. When the system 150 receives information regarding a predicted runtime error input (e.g., text information) from the system 150, the artificial intelligence model (e.g., the GPT-3 model) may process the predicted runtime error input text and generate new code with an identified solution and push the resolved version build code to the to the data repositories 130 for repackaging and build/deployment. Once a solution is found, the results may be automatically sent to the system 150 for use in training one or more AI models.

Figure 1B:
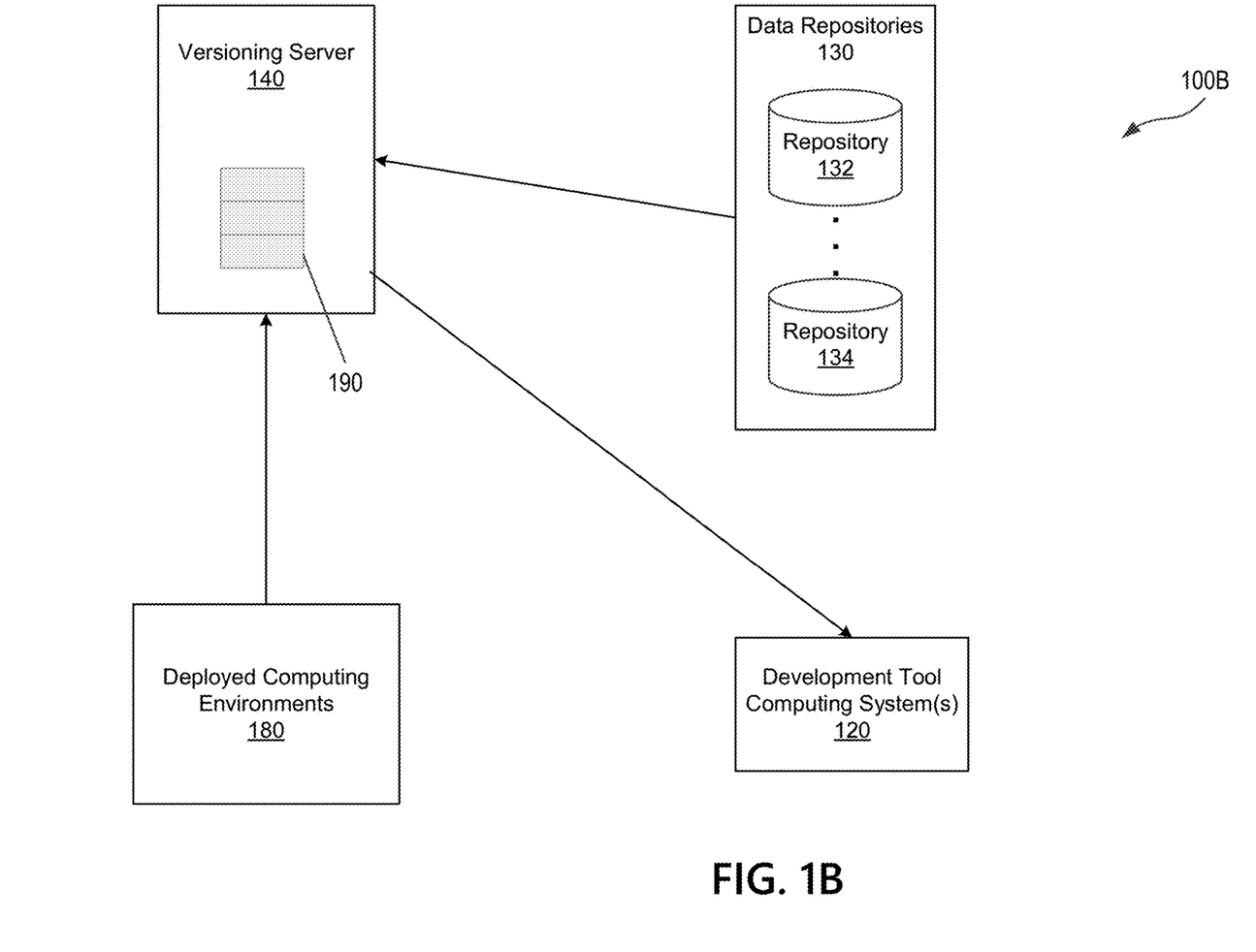
FIG. 1B shows an illustrative block diagram of an intelligent runtime system that automatically resolves some runtime errors in accordance with one or more aspects described herein.

FIG. 1B shows an illustrative block diagram of an intelligent runtime system that automatically resolves some runtime errors in accordance with one or more aspects described herein. The table 190 may be dynamically populated when the code is executing at runtime. The table 190 may store a BlockID (or ReferenceID) that is assigned to that code that when executed at runtime will cause the runtime execution to be directed to a compatible, earlier version 132 of the libraries in the data repositories 130 instead of a newer release version 134 that triggers a runtime exception or error. The BlockID may be, in some embodiments, a combination of file name and line number, such that it will be unique across the entire codebase. In some examples, each row in the mapping table 190 may comprise a source code block identifier and a compatible library version identifier such that execution of the compiled code is directed to a first compatible library version identifier corresponding to a new version of the library if no error is caught, else the execution of the compiled code is directed to a second compatible library version identifier corresponding to the previous, stored version of the library without causing the execution of the code to halt (e.g., throw an error that crashes and/or interrupts application flow).

Figure 2A:
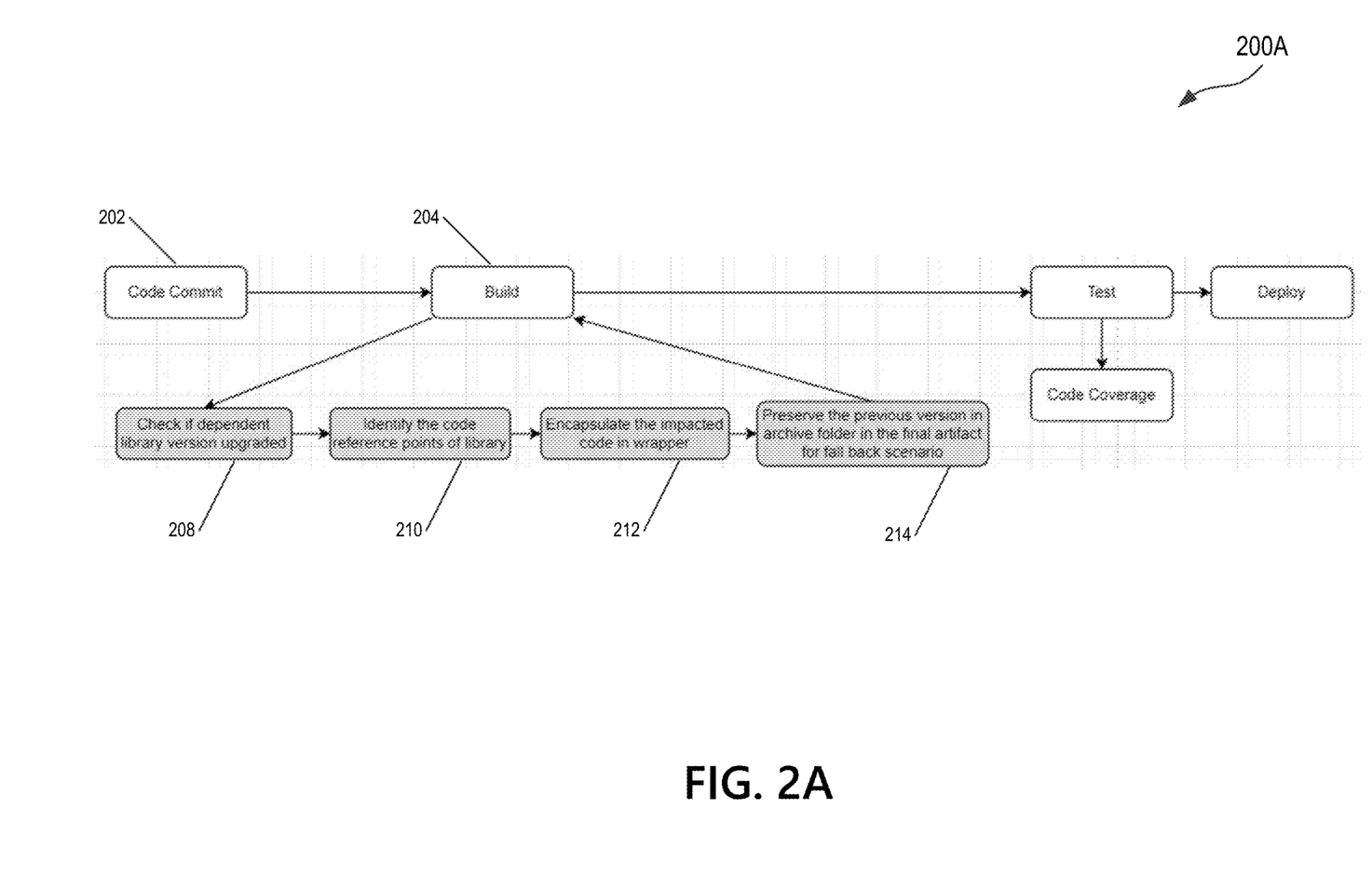
FIG. 2A and FIG. 2B (collectively referred to as "FIG. 2") show an illustrative build method for software using AI and one or more aspects in accordance with aspects described herein.

FIG. 2A, as explained in more detail below, lists several novel steps in the updated build process 200A contemplated by this disclosure. When software code is checked or committed (see step 202), the system uses generative artificial intelligence (AI), by the build system (in step 204) to check if any library versions being referenced in the code have changed or been updated (see step 208). And if they have, then dependent code is marked (see step 210) as vulnerable to runtime exceptions. The marked code is modified by the build system to encapsulate (see step 212) the potentially vulnerable code into a fall-back (e.g., catch-all) wrapper class, in some embodiments. Meanwhile, the earlier/previous version of the code that does not have compatibility issues is archived (see step 214) and stored in a data repository. In some examples, the archived code may be stored in a "/archive" folder to use if a runtime exception is triggered. If such an exception is triggered, then the system can auto heal itself by running the previous version of the code from the library instead of the new library. Therefore, it heals itself.

Figure 2B:
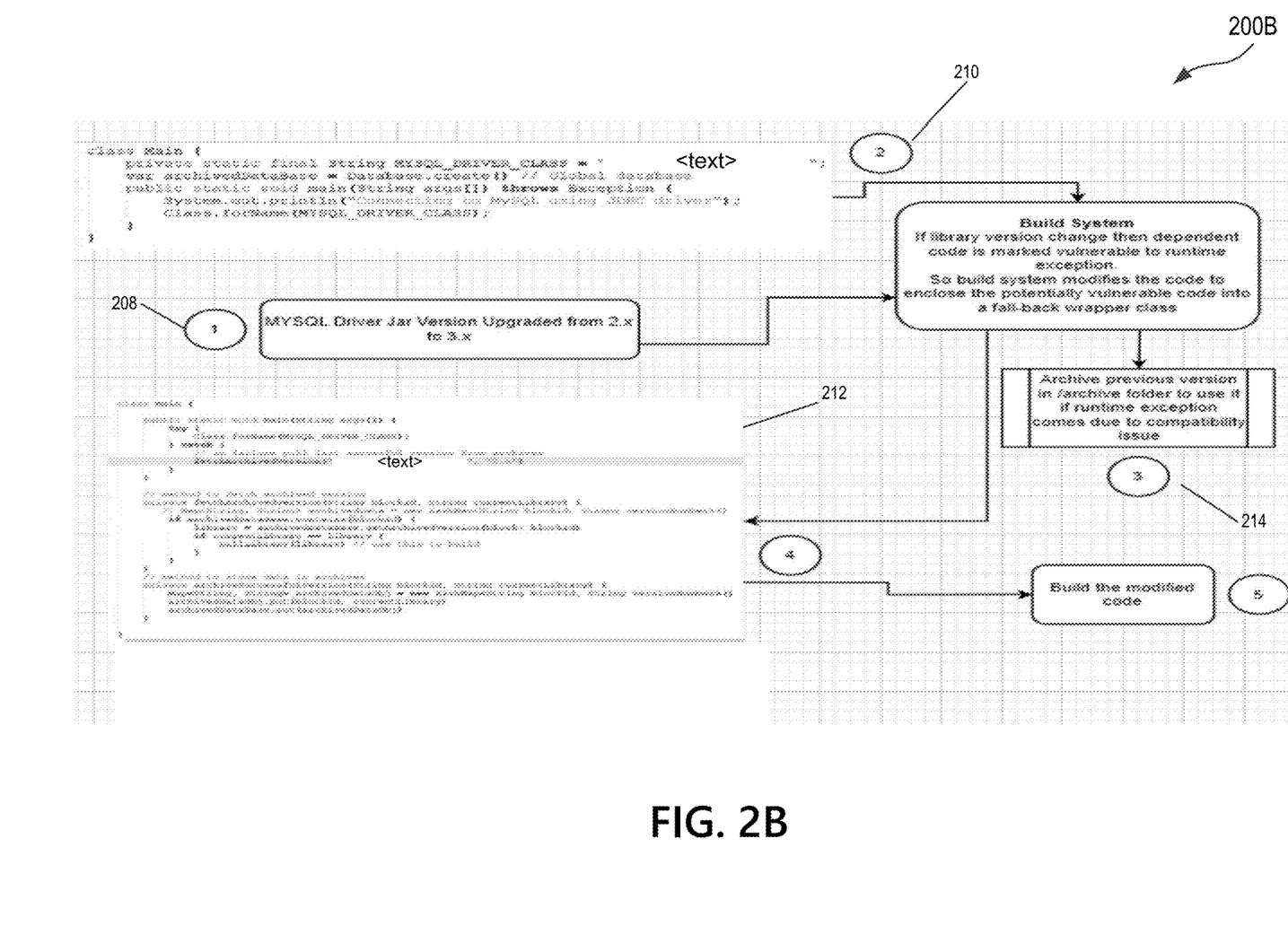
Figure 3:
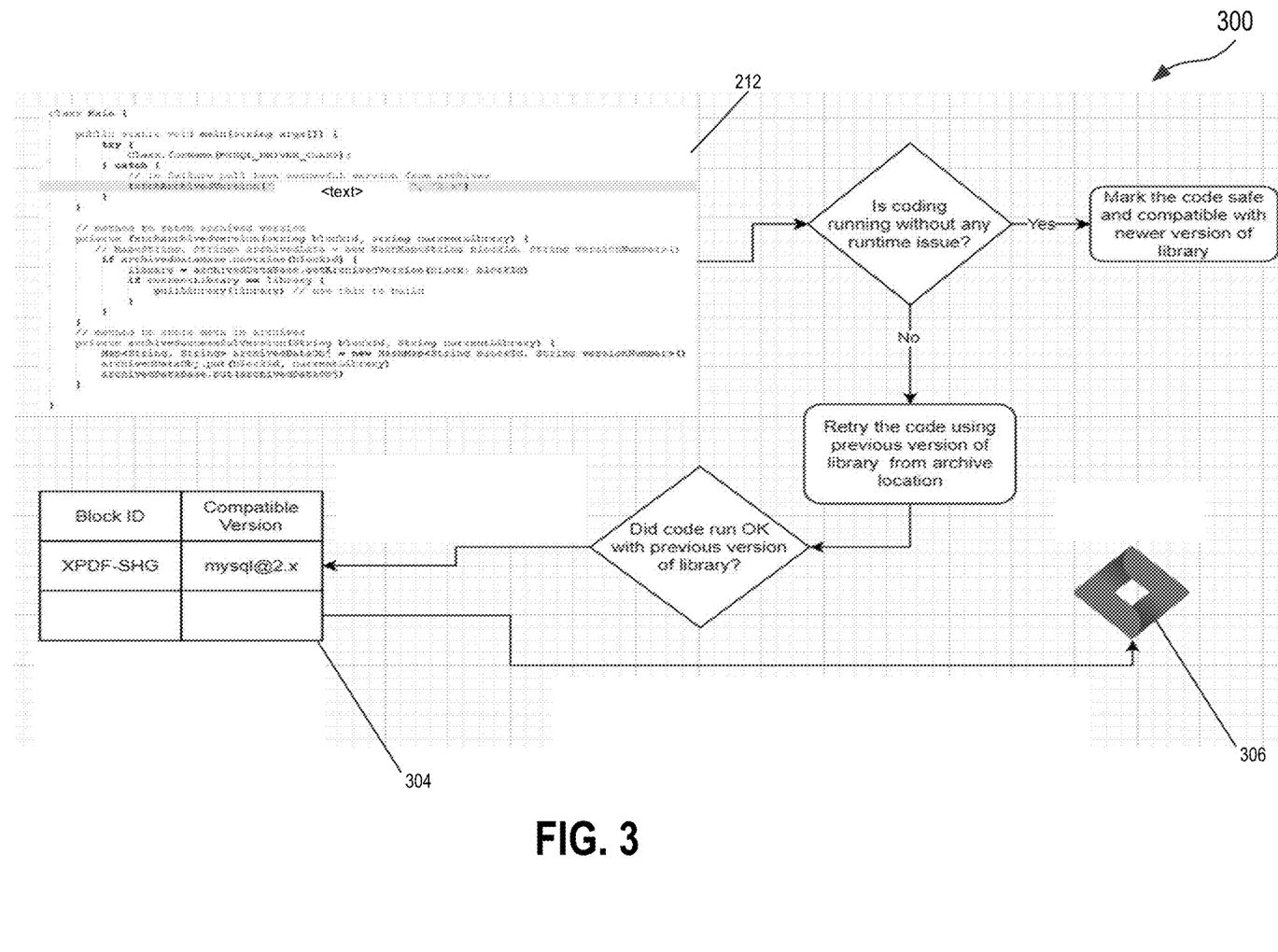
FIG. 3 shows an illustrative runtime method to auto heal runtime exceptions and/or errors in accordance with one or more aspects described herein.

Referring to FIG. 2B, in step 212, the system modifies the code in such a way that it heals itself from runtime exceptions coming due to version upgrade or compatibility issues by retrying it with previously successful library versions from an archive location (e.g., repository) and keeps this information in memory for the current release life cycle. Later, a versioning server 140 may use a table 190 to guide and/or redirect the runtime execution flow to the appropriate version of the library, as illustrated in FIG. 3. In step 208, denoted by a circled one, the intelligent build system may scan, by a generative artificial intelligence (AI) engine, the programming source code to identify the library referenced by the API call in the programming source code. For example, the library may be a MYSQL driver version upgraded from 2.x to 3.x, as illustrated in FIG. 2B, by the programming source code at the top of FIG. 2B. A build script stored on the intelligent build system may identify the programming source code and other files to be scanned. The intelligent build system may then in step 210, identify, by the generative AI engine, the chance that a runtime error may occur when the programming source code executes the API call. In this example, the API call may be call for the name of the MYSQL_DRIVER_CLASS. If the generative AI engine determines that the new version of the library (e.g., the jar version for the driver) is incompatible with the API call in the previous version of the library, then the generative AI engine generates a wrapper code to encapsulate the at least one line in the programming source code. The wrapper code may comprise a try-catch syntax structure that is configured to capture the runtime error without halting execution of the program flow. The intelligent build system then replaces at least one line in the programming source code with the generated wrapper code. As illustrated in FIG. 2B, the call to the forName method is nested within try and catch syntax to prevent a runtime error from stopping execution of the application-see step 212. Because the build system needs the previous version of the library to be available for execution of the API call by the wrapper code, in step 214, the previous version of the library is preserved in one or more repositories 130. Moreover, the mapping table 190 stored in the versioning server 140 is updated to redirect the API call in the programming source code to the previous version of the library or alternatively to the new version of the library, depending on the outcome of the wrapper code (e.g., whether an error is thrown and caught by the try-catch syntax). In a final step, denoted by the circled five, the compiler may compile the programming source code that has been modified by replacing the susceptible code lines with a wrapper code.

FIG. 3 shows an illustrative runtime flowchart 300 to auto heal runtime exceptions and/or errors in accordance with one or more aspects described herein. The runtime execution flow 212 is permitted to run without interruption until a runtime issue or error is triggered. But if the runtime code has a runtime issue, then a try-catch structure (or other mechanism for capturing exceptions/thrown errors) that is provided for in the build-time compiler redirects (see step 304) the runtime flow to a previous (or earlier prior) version of the library from the archive location (e.g., repository). For example, in some intelligent build computing systems, the try-catch syntax structure might not include a try syntax or a catch syntax but include syntax configured to capture the runtime error in another mechanism.

Referring to FIG. 3, the table 190 lists prior compatible versions of the libraries that, once the mapping in the table is created, then all future execution of the block code in a current release will use only the mapped version 304 of runtime execution flow. In some embodiments, a versioning server 140 may store a table 190 that is dynamically generated for use when executing the code at runtime. The table 190 may include at least a block ID (or reference ID) column and compatible version column to assist with mapping 304 the source code snippet that is associated with different (e.g., previous) versions of the same libraries. The block ID may be assigned to those source code lines that are changed by a generative AI engine (e.g., the generative AI version change identification (ID) system 150). The block ID may be generated using a combination of a file name, line number, and/or other attributes of the modified source code inserted into the existing build system code, such that the block ID is unique across the codebase.

Referring to FIG. 3, in step 306, the system may create a work item for the developers to know the runtime exception/compatibility issue with the specific details to block, exception, current auto-fix, and any other information useful to the developer (e.g., programmer, user) to troubleshoot in the future. To the extent that step 306 results in additional revisions to source code, the compiler may be executed again on the updated source code. Step 306 may include executing a build script on one or more build servers 160 to setup the environment and/or configurations before the updated source code is re-compiled, packaged, and/or deployed to servers 180 for future execution. Although FIG. 3 shows a flowchart box with "retry the code," in some embodiments, this represents the try-catch syntax that executes the code in an encapsulated fashion so that if the try section of the code triggers a runtime error, the catch section of the code executes—although this would not be exactly retrying of the same code, the spirit of the disclosure makes clear to a person having ordinary skill in the art after review of the entirety disclose herein, the intention of the flowchart.

Figure 4:
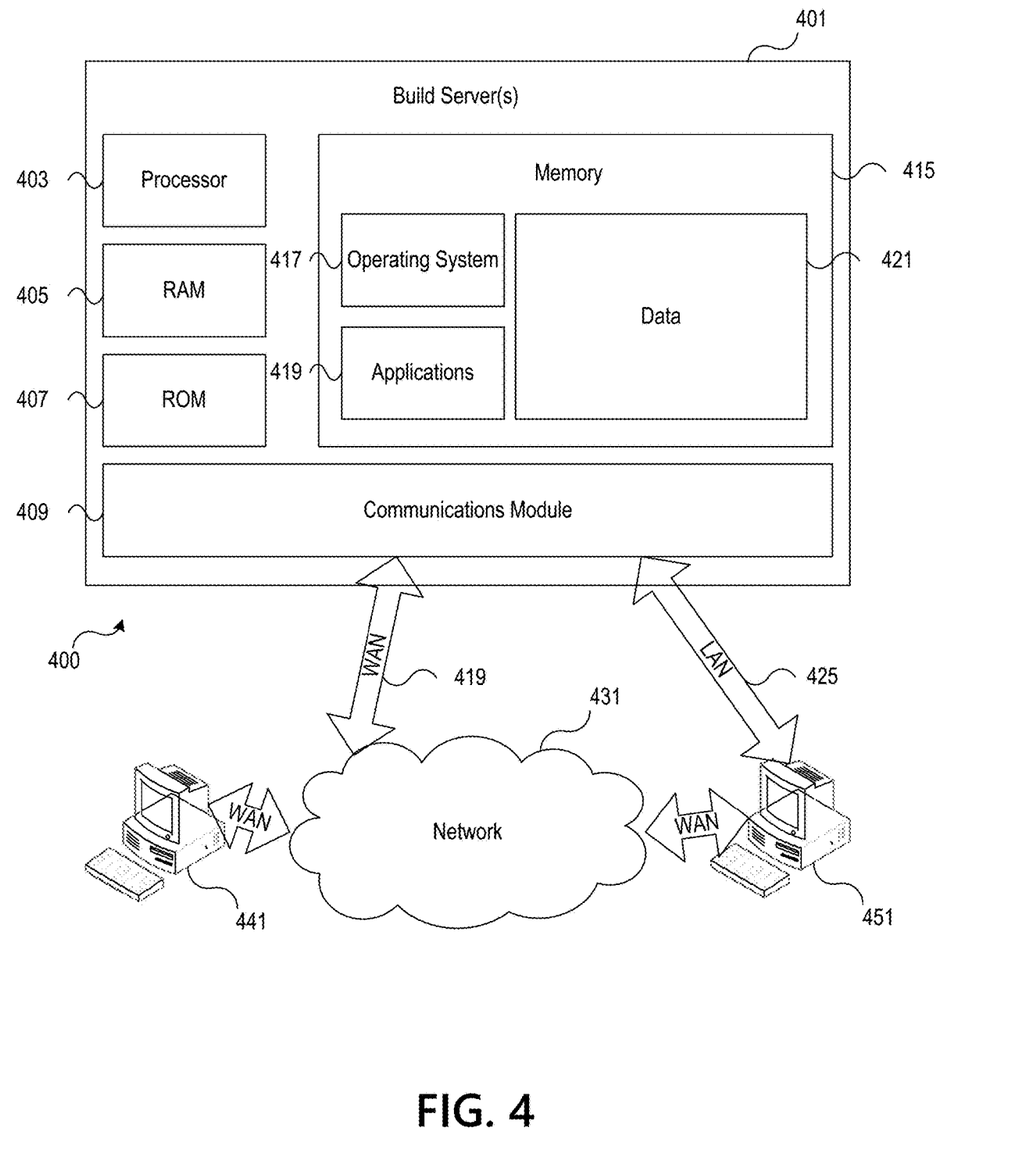
FIG. 4 shows one or more illustrative build servers in which various aspects of the disclosure may be implemented in accordance with one or more aspects described herein.

FIG. 4 shows an illustrative operating environment in which various aspects of the present disclosure may be implemented in accordance with one or more illustrative configurations. Referring to FIG. 4, a computing system environment 400 may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the illustrative computing system environment 400.

The computing system environment 400 may include an illustrative build server 401 having a processor 403 for controlling overall operation of the build server 401 and its associated components, including a random access memory (RAM) 405, a read-only memory (ROM) 407, a communications module 409, and a memory 415. The build server 401 may include a variety of computer readable media. Computer readable media may be any available media that may be accessed by the build server 401, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read-only memory (ROM), electronically erasable programmable read-only Memory (EEPROM), flash memory or other memory technology, CD-ROM, DVD or other optical disk storage, magnetic cassettes, magnetic tape, magnetic disk storage or other magnetic storage devices, or any other medium that can be used to store the desired information and that can be accessed by the build server 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 403 of the build server 401. Such a processor may execute computer-executable instructions stored on a computer-readable medium.

Software may be stored within the memory 415 and/or other digital storage to provide instructions to the processor 403 for enabling the build server 401 to perform various functions as discussed herein. For example, the memory 415 may store software used by the build server 401, such as an operating system 417, one or more application programs 419, and/or an associated database 421. In addition, some or all of the computer executable instructions for the build server 401 may be embodied in hardware or firmware. Although not shown, the RAM 405 may include one or more applications representing the application data stored in the RAM 405 while the build server 401 is on and corresponding software applications (e.g., software actions) are running on the build server 401.

The communications module 409 may include a microphone, a keypad, a touch screen, and/or a stylus through which a user of the build server 401 may provide input, and may include one or more of a speaker for providing audio output and a video display device for providing textual, audiovisual and/or graphical output. The computing system environment 400 may also include optical scanners (not shown).

The build server 401 may operate in a networked environment supporting connections to one or more remote computing devices, such as the computing devices 441 and 451. The computing devices 441 and 451 may be personal computing devices or servers that include any or all of the elements described above relative to the build server 401.

The network connections depicted in FIG. 4 may include a Local Area Network (LAN) 425 and/or a Wide Area Network (WAN) 429, as well as other networks. When used in a LAN networking environment, the build server 401 may be connected to the LAN 425 through a network interface or adapter in the communications module 409. When used in a WAN networking environment, the build server 401 may include a modem in the communications module 409 or other means for establishing communications over the WAN 429, such as a network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 5:
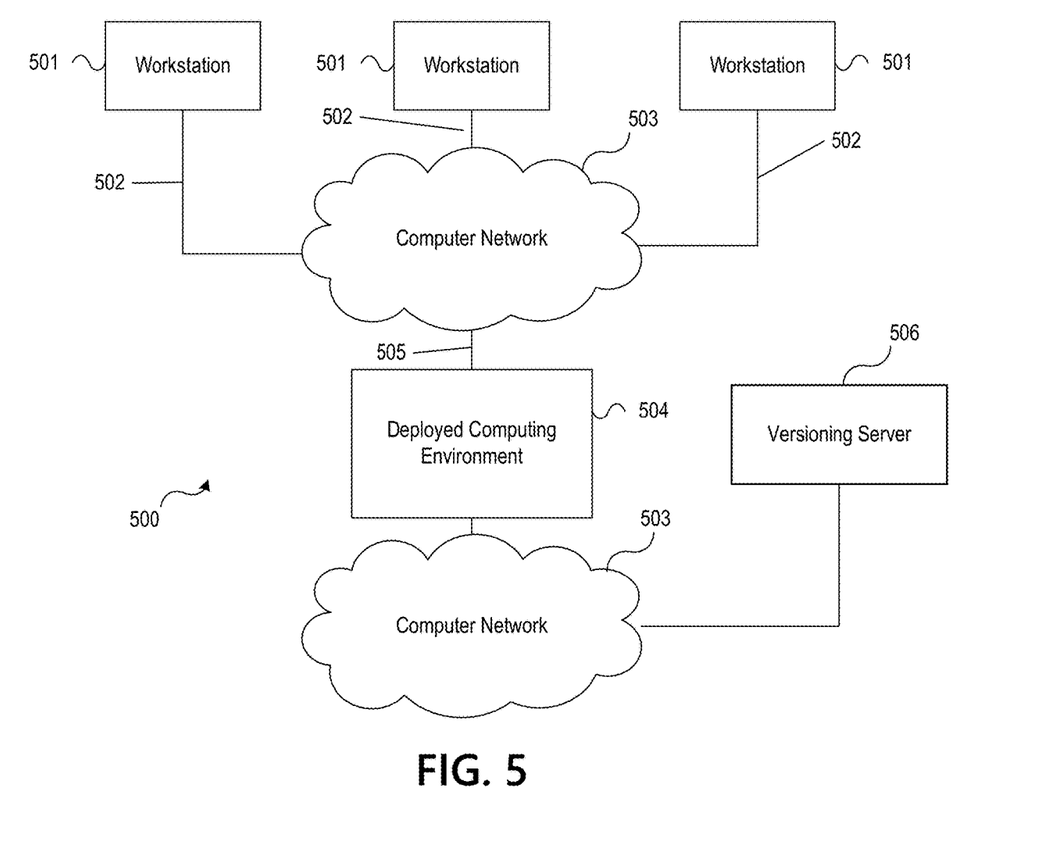
FIG. 5 shows an illustrative block diagram of workstations and servers that may be used to implement the processes and functions of certain aspects of the present disclosure in accordance with one or more aspects described herein.

FIG. 5 shows an illustrative block diagram of workstations and servers that may be used to implement the processes and functions of certain aspects of the present disclosure in accordance with one or more example embodiments. For example, an illustrative system 500 may be used for implementing illustrative embodiments according to the present disclosure. As illustrated, the system 500 may include one or more workstation computers 501. The workstation 501 may be, for example, a desktop computer, a smartphone, a wireless device, a tablet computer, a laptop computer, and the like, configured to perform various processes described herein. The workstations 501 may be local or remote, and may be connected by one of the communications links 502 to a computer network 503 that is linked via the communications link 505 to the deployed computing environment 504. In the system 500, the deployed computing environment 504 may be a server, processor, computer, or data processing device, or combination of the same, configured to perform the functions and/or processes described herein. The compiled code executing on the deployed computing environment 504 may access the versioning server 506 to access a table 304 stored in the versioning server 506. The table 304 may include identifiers to assist in directing the execution flow of the software application to the appropriate version of the library, as explained with respect to FIG. 1B and FIG. 3.

The computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 502 and 505 may be communications links suitable for communicating between the workstations 501 and the deployed computing environment 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular actions or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Some novel aspects disclosed herein include but are not limited to: (i) the build system introduces multi-version library support into a generated build artifact by, inter alia, keeping the previous successful libraries in archive instead of discarding them; (ii) the build system modifies the potentially impacted code (e.g., due to library version upgrade) and encloses it inside an auto-healing capability module; (iii) the auto-healing module, inserted by the build system at the time of build, keeps tracking the runtime exception, and if it detects a failure, then it retries the code using an older version of library from the archive location, instead of just throwing the exception out, but if a block of code works fine with archived version of library then it memorizes it for the current release life cycle and uses it until reset from outside (manual intervention); and (iv) the auto-healing backend module creates a work item (JIRA) for the developers to notify them the details of auto-fix, so that they can fix it in next release. These features, along with many others, are discussed in greater detail herein. The above-described examples and arrangements are merely some example arrangements in which the systems described herein may be used. Various other arrangements employing aspects described herein may be used without departing from the invention.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A build computing system for reducing runtime errors that halt execution of compiled code due to a new version of a library that is incompatible with a previous version of the library having an application program interface (API) call in the compiled code, the build computing system comprising:
   a compiler for programming source code, which comprises at least one line executing the API call;
   a versioning server communicatively coupled to one or more repositories configured to store multiple versions of the library including the previous version of the library and the new version of the library; and
   an intelligent build system comprising a processor and a memory including: (i) a build script that identifies the programming source code, and (ii) instructions that, when executed by the processor, cause the intelligent build system to:
      scan, by a generative artificial intelligence (AI) engine, at least the programming source code identified in the build script, to identify the library referenced by the API call in the at least one line in the programming source code;
      identify, by the generative AI engine, a chance that a runtime error occurs when the at least one line in the programming source code executes the API call, wherein the new version of the library is incompatible with the API call in the previous version of the library;
      generate, by the generative AI engine, a wrapper code to encapsulate the at least one line in the programming source code;
      replace, by the intelligent build system, the at least one line in the programming source code with the generated wrapper code, which comprises a try-catch syntax structure configured to capture the runtime error;
      preserve the previous version of the library in the one or more repositories so that the previous version of the library is available for execution of the API call by the wrapper code;
      compile, by the compiler, the programming source code after the replacing step is performed on the programming source code; and
      update a mapping table, which is stored in the versioning server, to redirect the API call in the programming source code to the previous version of the library or the new version of the library depending on the wrapper code.

2. The build computing system of claim 1, wherein the generative AI engine comprises a pre-trained artificial neural network model.

3. The build computing system of claim 1, wherein the generative AI engine comprises a pre-trained model that is trained on at least a log from one or more deployed computing environments, build packages, and library API reference documentation.

4. The build computing system of claim 1, wherein the preserving of the previous version of the library comprises:
   storing the previous version of the library in the one or more repositories;
   storing the new version of the library in the one or more repositories, wherein the new version of the library and the previous version of the library are both available for execution of the API call by the wrapper code; and
   causing the intelligent build system to update the mapping table.

5. The build computing system of claim 1, wherein the intelligent build system comprises instructions that, when executed by the processor, cause the intelligent build system to:
   update, by the generative AI engine, the build script to package the new version of the library and the previous version of the library into a build of the compiled programming source code; and
   deploy the compiled programming source code with both the new version of the library and the previous version of the library to one or more deployed computing environments.

6. The build computing system of claim 1, wherein each row in the mapping table comprises a source code block identifier and a compatible library version identifier, and execution of the compiled code is directed to a first compatible library version identifier corresponding to the new version of the library stored in the one or more repositories if no error is caught by the try-catch syntax structure, else the execution of the compiled code is directed to a second compatible library version identifier corresponding to the previous version of the library stored in the one or more repositories without halting execution of the compiled code.

7. The build computing system of claim 1, wherein the try-catch syntax structure does not include a try syntax or a catch syntax but includes syntax configured to capture the runtime error.

8. The build computing system of claim 1, wherein the runtime error is Class Not Found, and the runtime error occurs when the at least one line in the programming source code fails to find an object class that has been deprecated during a transition from the previous version of the library to the new version of the library.

9. The build computing system of claim 1, wherein the chance that the runtime error occurs is determined by: (i) testing execution of the programming source code to catch if any runtime errors occur using API calls to the new version of the library, and (ii) when any runtime errors are caught, retrying execution of the programming source code using API calls to the previous version of the library.

10. The build computing system of claim 1, wherein the chance that the runtime error occurs is determined by: (i) testing execution of the programming source code to catch if any runtime errors occur using API calls to the new version of the library, and (ii) when any runtime errors are caught, retrying execution of the programming source code using API calls to the previous version of the library.

11. The build computing system of claim 1, wherein the chance that the runtime error occurs is determined by the generative AI engine using at least a log from one or more deployed computing environments and library API reference documentation.

12. The build computing system of claim 1, wherein the generative AI engine comprises a pre-trained model that is trained on at least information of historical successful builds and historical runtime errors.

13. The build computing system of claim 1, wherein the multiple versions of the library comprise appropriate library dependencies, and wherein the library includes a project jar file.

14. The build computing system of claim 1, wherein the intelligent build system comprises instructions that, when executed by the processor, cause the intelligent build system to:
   deploy the compiled programming source code with both the new version of the library and the previous version of the library to a virtual computing environment for testing and AI model training purposes.

15. A method for reducing runtime errors that halt execution of compiled programming source code due to a new version of a library that is incompatible with a previous version of the library having an application program interface (API) call in the compiled programming source code, the method comprising steps to:

scan, by a generative artificial intelligence (AI) engine in an intelligent build system, at least the programming source code identified in a build script, which is stored on the intelligent build system;

identify, by the generative AI engine, a chance that a runtime error occurs when at least one line in the programming source code executes the API call, wherein the new version of the library is incompatible with the API call in the previous version of the library;

generate, by the generative AI engine, a wrapper code;

encapsulate, by the intelligent build system, the at least one line in the programming source code with the wrapper code by replacing the at least one line in the programming source code with the wrapper code;

preserve the previous version of the library in one or more repositories configured to store multiple versions of the library including the previous version of the library and the new version of the library, wherein the preserving makes the previous version of the library available for execution of the API call by the wrapper code; and update a mapping table, which is stored in a versioning server communicatively coupled to the one or more repositories, to redirect the API call in the programming source code to the previous version of the library or the new version of the library depending on the wrapper code.

16. The method of claim 15, wherein the generative AI engine comprises a pre-trained artificial neural network model that is trained on at least a log from one or more deployed computing environments, build packages, and library API reference documentation.

17. The method of claim 15, wherein the wrapper code comprises a try-catch syntax structure configured to capture the runtime error, and wherein each row in the mapping table comprises a source code block identifier and a compatible library version identifier.

18. The method of claim 17, wherein when no error is caught by the try-catch syntax structure, then the mapping table redirects the API call in the programming source code to the new version of the library, else the mapping table redirects the API call in the programming source code to the previous version of the library.

19. One or more non-transitory memory devices storing instructions that, when executed by a processor, cause an intelligent build system to:

scan, by a generative artificial intelligence (AI) engine, at least the programming source code identified in a build script, which is stored on the intelligent build system;

generate, by the generative AI engine, a wrapper code for at least one line in the programming source code that executes an application program interface (API) call, wherein a new version of the library is incompatible with the API call in a previous version of the library, and wherein the wrapper code comprises a try-catch syntax structure configured to capture a runtime error;

encapsulate the at least one line in the programming source code with the wrapper code by replacing the at least one line in the programming source code with the wrapper code;

store the previous version of the library in one or more repositories configured to store multiple versions of the library including the previous version of the library and the new version of the library;

make available the previous version of the library for execution of the API call by the wrapper code; and update a mapping table to redirect the API call in the programming source code to the previous version of the library or the new version of the library depending on the wrapper code, wherein the intelligent build system reduces runtime errors that halt program execution due to the new version of a library being incompatible with the previous version of the library having the API call.

20. The one or more non-transitory memory devices of claim 19, wherein the generative AI engine comprises a pre-trained model that is trained on at least a log from one or more deployed computing environments, build packages, and library API reference documentation.

* * * * *